United States Patent
Chang (10) Patent No.: US 6,707,576 B1
(45) Date of Patent: Mar. 16, 2004

(54) NOISE MODULATION ERROR DIFFUSION OF DIGITAL HALFTONING

(75) Inventor: William H. Chang, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 0 days.

(21) Appl. No.: 09/453,324

(22) Filed: Dec. 2, 1999

(51) Int. Cl.$^7$ ............................................. G06K 15/00
(52) U.S. Cl. ...................... 358/1.9; 358/3.03; 358/3.05; 382/252
(58) Field of Search ................... 358/1.9, 3.03, 358/3.04, 3.05; 382/237, 251, 252

(56) References Cited

U.S. PATENT DOCUMENTS

| | | |
|---|---|---|
| 4,654,721 A | 3/1987 | Goertzel et al. |
| 5,045,952 A | 9/1991 | Eschbach |
| 5,051,804 A | 9/1991 | Morse et al. |
| 5,051,844 A | 9/1991 | Sullivan |
| 5,070,413 A | 12/1991 | Sullivan et al. |
| 5,208,871 A | 5/1993 | Eschbach |
| 5,268,774 A | 12/1993 | Eschbach |
| 5,313,287 A | 5/1994 | Barton |
| 5,353,127 A | 10/1994 | Shiau et al. |
| 5,375,002 A | 12/1994 | Kim et al. |
| 5,402,245 A | 3/1995 | Motta et al. |
| 5,473,439 A | 12/1995 | Pappas |
| 5,493,416 A | 2/1996 | Fan |
| 5,555,103 A | 9/1996 | Anderson |
| 5,561,751 A | 10/1996 | Wong |
| 5,581,371 A | 12/1996 | Spaulding et al. |
| 5,582,582 A | 12/1996 | Chapman |
| 5,592,590 A | 1/1997 | Jolly |
| 5,592,592 A | 1/1997 | Shu |
| 5,668,638 A | 9/1997 | Knox |
| 5,673,121 A | 9/1997 | Wang |
| 5,692,109 A | 11/1997 | Shu |
| 5,696,602 A | 12/1997 | Cooper et al. |
| 5,712,927 A | 1/1998 | Kim et al. |
| 5,726,772 A | 3/1998 | Parker et al. |
| 5,727,453 A | 3/1998 | Tippmann |
| 5,737,413 A | 4/1998 | Akiyama et al. |
| 5,737,452 A | 4/1998 | Schiller |
| 5,737,453 A | 4/1998 | Ostromoukhov |
| 5,739,917 A | 4/1998 | Shu et al. |
| 5,745,259 A | 4/1998 | Ulichney |
| 5,748,785 A * | 5/1998 | Mantell ....................... 382/237 |
| 5,757,517 A | 5/1998 | Couwenhoven et al. |
| 5,757,976 A | 5/1998 | Shu |
| 5,809,177 A | 9/1998 | Metcalfe et al. |
| 5,835,238 A | 11/1998 | Mantell |
| 5,835,687 A | 11/1998 | Brown et al. |

OTHER PUBLICATIONS

"Recent Progress in Digital Halftoning," ed. Reiner Eschbach, Society for Imaging Science & Technology, 1994.

Uwe Meyer–Gruhl, "Improvements for Color Dithering," Forschungsgruppe Bildverstehen (FG BV), Informatik IX, Technische Universität München, Orleansstr. 34, 81667, p. 1–4, München, Germany.

Ulichney, *Digital Halftoning*, 1996, Fifth printing, pp. 1–362, Massachusetts Institute of Technology.

"Digital Halftoning", www.ee.ubc.ca/home/comlab1/i...www/techpapger/introip/manual04.html, Apr. 6, 1999.

(List continued on next page.)

*Primary Examiner*—Thomas D. Lee
(74) *Attorney, Agent, or Firm*—Chernoff, Vilhauer, McClung & Stenzel, LLP (57) ABSTRACT

An output color is selected for a subject pixel by comparing an input color signal to a boundary separating available output colors. The input color signal is adjusted, at least in part, to reflect a relationship between the output color and the input color signal for another pixel. The boundary is adjusted, at least in part, to reflect a change in the magnitude of a noise source.

29 Claims, 6 Drawing Sheets

OTHER PUBLICATIONS

Mulligan, "Improving Digital Halftones by Exploiting Visual System Properties," www/vision.arc.nasa,gov/publications/asilpap.html, Mar. 2, 1999, NASA Ames Research Center, Moffett Field, CA.

"SID 99' Late news and Withdrawn Papers," The Society for Information Display, www.sid.org.html.

SPIE– The International Society for Optical Engineering; *Image Processing Algorithms and Techniques II*;MehmenT. Civanlar, Sanjit K. Mitra, anad Robert J. Moorehead II; vol. 1452, Feb. 25, 1991; pp. 47–56.

SID—Society For Information Display, Digest of Technical Papers, *Comparison and Ptimization of Computer–Generated Digital Halftone Pictures*, Peter Stucki; Vlumen VI, Apr. 1975, Los Angeles, CA; pp. 34–36.

Journal of the Optical Society of America, *Error–diffusion algorithm with edge enhancement*, Reiner Eschback and Keith T. Know, vol. 8, No. 12, Dec. 1991, pp. 1844–1850.

IS&T'S 47th Annual Conference, vol. II, *ICPS' 94: The Physics and Chemistry of Imaging Systems*; K.T. Knox, Xerox corporation, May 1994, pp. 456–459.

SPIE—The International Society for Optical Engineering, *Human Vision and Electronic Imaging III*, Bernice E. Rogowitz, Thrasyvoulos N. Pappas; Jan. 1998, San Jose, California vol. 3299, pp. 452–460.

Institute of Electrical and Electronics Engineers, Inc.; *An Optimum Method for Two–Level Rendition of Continuous–Tome Pictures*, B.E. Bayer, Research Laboratories, Eastman Kodak Company, Rochester, New York, Jun. of 1973, Seattle, Washington: Cat. No. 73 ; pp. 2611–2615.

IS&T'S 47th Annual Conference, vol. II, *ICPS' 94: The Physics and Chemistry of Imaging Systems*; Model –Based Halftoning viaDirect Binary Search, Allebach, Flohr, Hilgenberg, Atkiins and Bouman; School of Electrical Engineering Purdue University, Indiana, May 1994, pp 476–481.

SID—Society For Information Display, Digest of Technical Papers, *An Adaptive Algorithm for Spatial Greyscale*, Robert W. Floyd and Louis Steinberg, vol. 17, No. 2 Second Quarter of 1976, Los Angeles, CA.

IS&T'S 45th Annual Conference, Imaging '92 *Error Diffusion Algorithm with Reduced Artifacts*; Xerox Webster Research Center, Nebster, New York; pp. 133–136.

IEICE Trans. Inf. & Syst., Vol E 79–D, No. 6, Jun. 1996.*Content Based Video Indexing and Retrieval—A Natural Language Approach–*, Yeun–Bae Kim and Masahiro Shibata; pp. 695–705.

IS&T'S 8th Annual Conference 1992, *Analysis of Threshold Modulation in error diffusion*, Keith T. Know and Reiner Eschback of Xerox, Webster Research Center, Webster, New York.; pp. 280–281.

\* cited by examiner

FIG. 6

NOISE MODULATION ERROR DIFFUSION OF DIGITAL HALFTONING

BACKGROUND OF THE INVENTION

The present invention relates to digital halftoning of continuous tone images and, more particularly, to a method of error diffusion for digital halftoning.

Digital halftoning is a technique for rendering continuous tone images on display devices that are incapable of producing the number of levels of luminance or chrominance that are contained in the original image. By way of example, digital halftoning is used to print images having continuous gray levels on printers that are only capable of binary output; that is, printing (or not printing) a black dot. Likewise, digital halftoning may be used to display continuous tone color images on displays that are only capable of rendering a limited number of combinations of red, green, and blue.

To render an image with a halftoning process, the colors of the image's picture elements or pixels are sampled and quantized. The color of a pixel may be represented by the levels of the composite luminance and chrominance signals. The luminance of the pixels of continuous tone gray images is quantized into gray levels for rendering with binary output devices. Typically, gray tones are quantized with 256 levels facilitating description of a pixel by eight data bits. For color displays, the composite luminance and chrominance signals are converted to individual "red, green, and blue" signals or "cyan, magenta, yellow, and black" signals as required by digital color output devices.

To print or display an image with halftoning, the image is decomposed into a grid of halftone cells each containing a number of picture elements or pixels. The gray of an area of the original image is simulated by printing or displaying black pixels distributed throughout the halftone cells of the corresponding area of the rendered image. Likewise, colors not included in an output device's color pallette are simulated by distributing pixels throughout the halftone cell printed or displayed with "nearby" colors available from the pallette. Digital halftoning is effective because of the tendency of the human visual system to ignore fine detail and primarily sense the overall intensity of an area of an image.

One common technique for digital halftoning is error diffusion or spatial dithering. Error diffusion was first disclosed by Floyd and Steinberg in *AN ADAPTIVE ALGORITHM FOR SPATIAL GRAYSCALE*, Proceedings of the Society for Information Display, vol.17–2, pages 75–77 (1976). In the error diffusion technique the color of each pixel of the original image is measured and quantized. An input color signal representing the measured color of the pixel plus an error diffusion adjustment is compared to a preselected threshold or boundary signal that divides the signals representing the available display colors in the device's pallette. A display color nearest the original color is selected and the output device is instructed to render the subject pixel in this display color. The error or difference between the adjusted input color signal for the subject pixel and the display color chosen from the pallette is determined. The error is divided according to a weighting function to create a plurality of diffusion adjustment factors. The diffusion adjustment factors are fed back to the input and added to the input color signals for pixels neighboring the first pixel. The adjusted input color signal is, therefore, the measured color value of the pixel plus the accumulated adjustment factors resulting from quantization errors in selecting display colors for neighboring pixels. In other words, the quantization error resulting from selecting a color for a pixel from a limited pallet is diffused over the area neighboring that pixel. The portion of the error distributed to each pixel and the dimensions and shape of the neighborhood over which the error is distributed differ for several specific variants of the error diffusion technique.

While error diffusion is one of the most effective and common techniques for digital halftoning, the signal delay of the process can generate undesirable artifacts in the output image. In highlight and shadow areas, error diffusion can produce "worms," transient noise, and edge delays. In midtone areas, error diffusion can produce unpleasant patterning and pattern shifts. Adding noise to the boundary to randomize the threshold decision or utilizing multiple diffusion filters with varying adjustment factor weighting have been suggested as ways to reduce or eliminate these artifacts. However, these techniques either reduce the quality of the output image or increase the processing delay and often the cost of the halftoning processor.

What is desired, therefore, is a method for error diffusion for halftoning that significantly reduces or eliminates artifacts in the rendered image and which does not adversely impact image quality, the latency of the halftoning process, or unduly complicate the halftoning processor.

BRIEF SUMMARY OF THE INVENTION

The present invention overcomes the aforementioned drawbacks of the prior art by providing a technique for selecting an output color for a subject pixel by comparing an input color signal to a boundary separating available output colors. The input color signal is adjusted, at least in part, to reflect a relationship between the output color and the input color signal for another pixel. The boundary is adjusted, at least in part, to reflect a change in the magnitude of a noise source.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
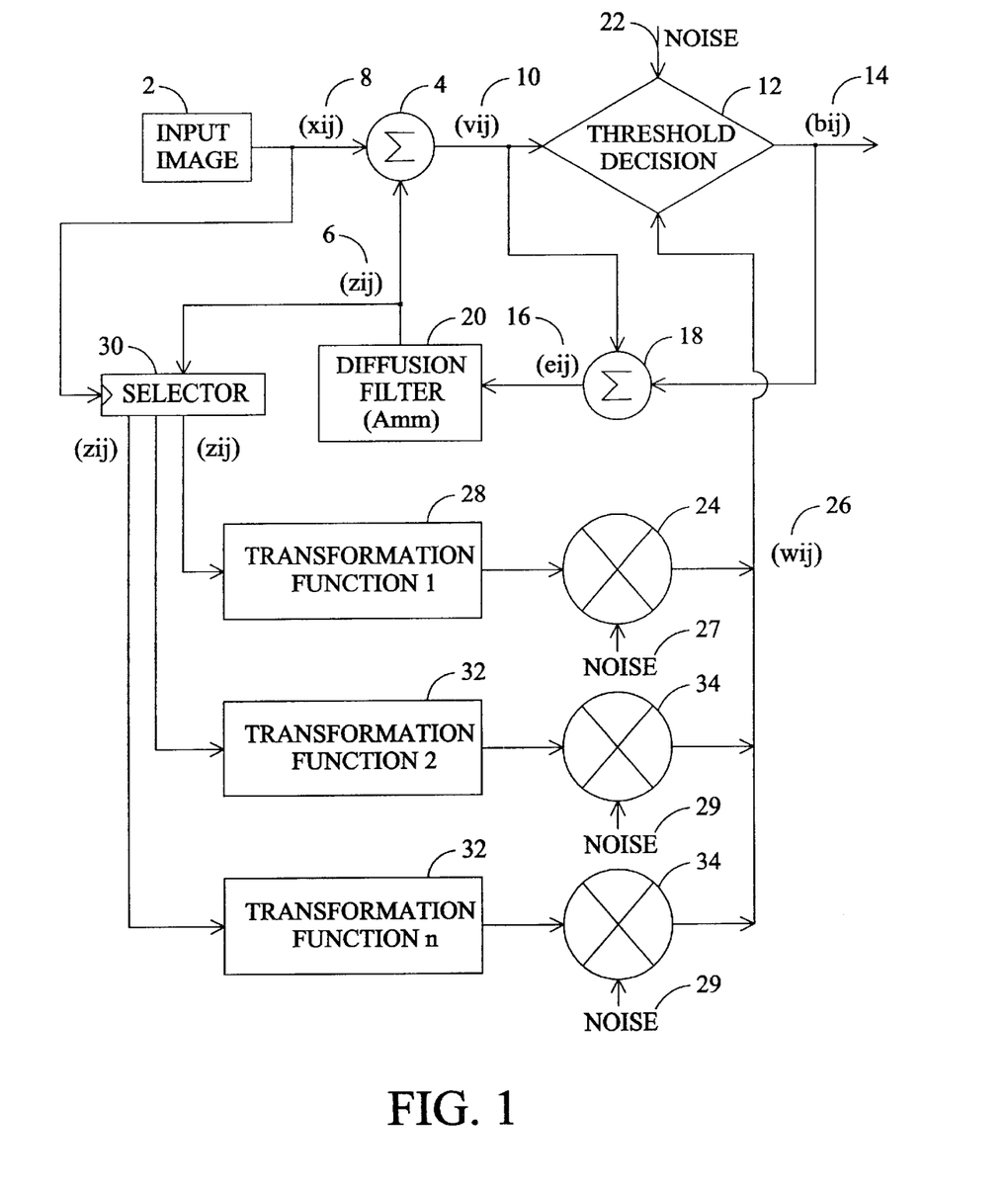
FIG. 1 is an exemplary block diagram of the error diffusion method of the present invention.

The diffusion method of the present invention is illustrated in FIG. 1. To display an image 2, a sequence of digital color values or signals (xij) 8 representative of the image's pixels are inputted to the error diffusion process. These digital color values or signals represent the luminance or the luminance and chrominance of the pixels and may be expressed as gray levels or combinations of primary colors.

It is to be understood that any representation of the pixel values may be used, as desired. A summer 4 adds a diffusion adjustment (zij) 6 to the input color signal (xij) 8 for a subject pixel to produce an adjusted input color signal (vij) 10. In other words, the summer 4 modifies the input color signal in some manner.

The output color corresponding to an output signal (bij) 14 is selected by a threshold decision 12 comparing the adjusted input color signal (vij) 10 to one or more boundaries that separate the output colors available in the display device's pallette. For example, if the display device is a binary (black and white) printer utilizing integer operation the boundary is, typically, preselected at 128. This represents a gray level midway between 0 (white) and 256 (black). If the adjusted input color signal 10 is greater than 128, black (256) is selected as the output color or output signal (bij) 14 to be sent to the printing mechanism. If the adjusted input color signal 10 is less than 128, white (0) or "do not print" is the output color or output signal (bij) 14 to the printing mechanism.

In applying the error diffusion technique, the difference between the output color or output signal (bij) 14 and the adjusted input color signal (vij) 10 for the subject pixel or the error (eij) 16 is calculated by a summer 18. In a diffusion filter 20 the error (eij) 16 is divided into a number of weighted adjustment factors (zij) 6 which are added to the input color signals (xij) 8 to produce the adjusted input color signals (vij) 10 of pixels neighboring the subject pixel when those pixels are processed. For example, the diffusion filter 20 of the Floyd and Steinberg algorithm described in *AN ADAPTIVE ALGORITHM FOR SPATIAL GRAYSCALE*, Proceedings of the SID, 17/2, 75–77 (1976) distributes 7/16 of the error (eij) 16 to the pixel immediately to the right of the subject pixel, 3/16 of the error to the pixel to the left and below the subject pixel, 5/16 of the error to the pixel immediately below the subject pixel, and 1/16 of the error to the pixel to the right and below the subject pixel. Diffusion filters distributing the error in different proportions and over neighborhoods of different sizes and shapes can be utilized. The adjusted input color signal (vij) 10 is, therefore, the input color signal (xij) 8 of the original image plus the sum of the accumulated adjustment factors 6 due to error in neighboring pixels. As a result of the error diffusion process, the quantization error produced when the output signal (bij) 14 for a pixel is selected from a pallette with fewer choices than are available for the input signal (xij) 8 is distributed over the pixels in an area that neighbors the pixel subject to the quantization error.

Color error diffusion is a three-dimensional extension of the binary (black or white) process with a quantizer containing $2^k$ output colors representing points in a three-dimensional color space. The output colors are typically not an arbitrary set of colors but colors resulting from the combination of three (red, green, and blue) or four (cyan, magenta, yellow, and black) primary colors that the output device can display. The boundary represents a surface separating the three-dimensional color spaces surrounding the output colors available in the pallette. The error 16 to be distributed to future input values (xij) 8 represents a vector between the corrected input value (vij) 10 and the quantized output value (bij) 14.

Optionally, noise 22 can be added to the boundary to produce random changes in the boundary to reduce the likelihood that the threshold decision will develop a repeating pattern leading to an artifact. On the other hand, noise destroys some image details and can cause the output image to have a "grainy" appearance.

The present inventor came to the realization that undesirable artifacts produced by the error diffusion technique are the result, at least in part, of a "uniform" noise applied to all portions of the image without regard to the local content of the image. Accordingly, the present inventor came to the realization, in one aspect of the present invention, that adaptive noise may be used to modulate the threshold decision 12 to reduce undesirable artifacts. A "valve" filter 24 is used to filter a noise input 27 based upon the adjustment factor 6 computed by the diffusion filter 20. The valve filter 24 preferably regulates the magnitude of the noise 27 to produce a boundary adjustment factor (wij) 26 which is used to modify the boundary for the threshold decision 12. In essence, the noise is adaptively introduced to the thresholding decision based on the state of local conditions in the image, including the adjustment factor (zij) 6 and the current pixel being processed, if desired. The boundary adjustment is applied to neighboring pixels to neutralize the quantization error produced by the diffusion filter 8 and correct artifacts that are produced by that error. The valve filter 24 may incorporate any suitable modulation function, as desired.

A transformation function 28 may be incorporated to convert the adjustment factor (z(ij)) 6 into an imaging space that can be better modeled for input to the valve filter 24. Transformation functions 28 may be selected based on factors such as the output device type, of the type of ink, or print medium used. Transformation functions may also be tailored to the elimination of a particular artifact or to enhance certain local image features. As such, the transformation function 28 is preferably Guassian like. To further improve image quality, a selector 30 may be used to choose from multiple valve filters 24 and 34 and transformation functions 28 and 32 on the basis of the value of the input color signal (x(ij)) 8 or one of its constituent parameters.

Error diffusion by the preferred method of the invention may be described by the following mathematical expressions:

$$b(ij) = \text{step}[x(ij) + \Sigma A(n)*E(I-nm,j-n) + \text{Prob}(X,(\Sigma F(E(i-m),j-n))))*\text{Noise}(S)-T],$$

and $$E(ij) = B(ij) - [x(ij) + \Sigma A(mn)*E(I-m,j-n),$$

where Prob is a probability function determined and estimated for the purpose of controlling the amount of noise needed for each particular state during processing. F( ) is a transformation function to transform the discrete non-linear space of calculated error into a space that is more linear and suitable for mathematical and statistical modeling. F( ) may be an identity, if desired. Noise (S) may be any noise, such as a spatially dependent blue noise, patterned noise, or time dependent noise such as white noise.

Figure 2:
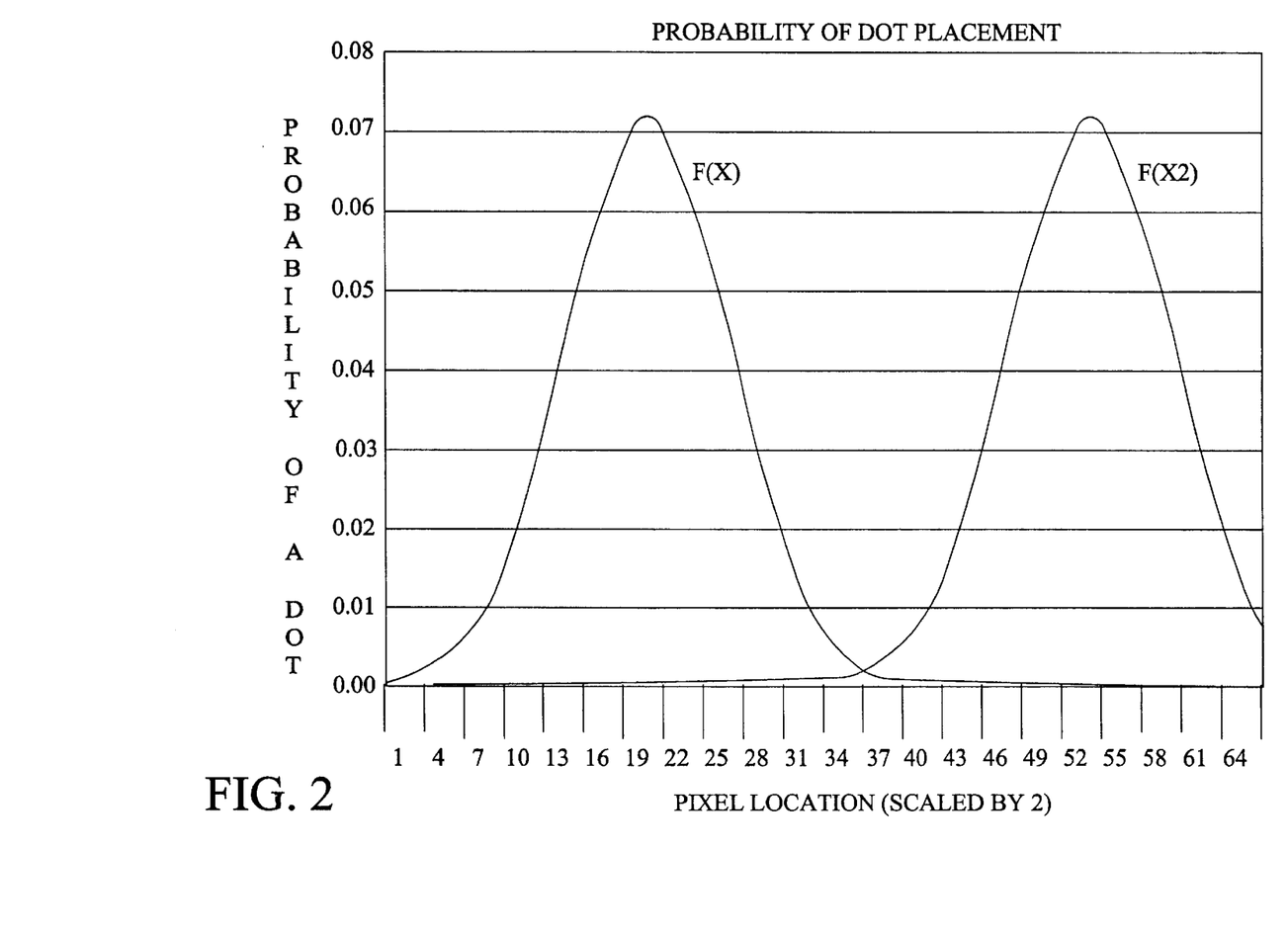
FIG. 2 is a graph of a probability of dot placement.

Based on the realization that locally adapted noise is desirable, the present inventor then undertook an ingenious development of the most desirable noise. For each input gray level to the system there is a principal frequency and wavelength. For example, at input gray level=1, the ideal wavelength is 16 pixels. Referring to FIG. 2, an example of a probability function for an error diffusion at input gray level equal one is shown. The horizontal axis represents pixel position scaled by 2 (for ease of viewing). The vertical axis represents the probability function of a dot to be placed at that particular pixel location (b(ij)). The model used in FIG. 2 for the probability of dot placement is assumed to be a Normal Guassian distribution with the standard deviation (Sd)=2. The mean (M) is centered at the principal wavelength W for that particular input gray level. For gray level=1, W=16 pixels. Standard deviation is chosen to be 2, so that there is a probability of 95% for a dot to be placed within an area of radius=16 pixels. That may be represented as:

$$P(M-2*Sd<=X<=M+2*Sd)=0.95$$

It is to be understood that the particular mathematical model chosen for the probability of dot placement is highly device dependent as different characteristics of the printer engine, ink, media, dot size, dot grain, and combination of artifact produced by error diffusion and other factors will influence the optimal choice for a particular model.

Figure 3:
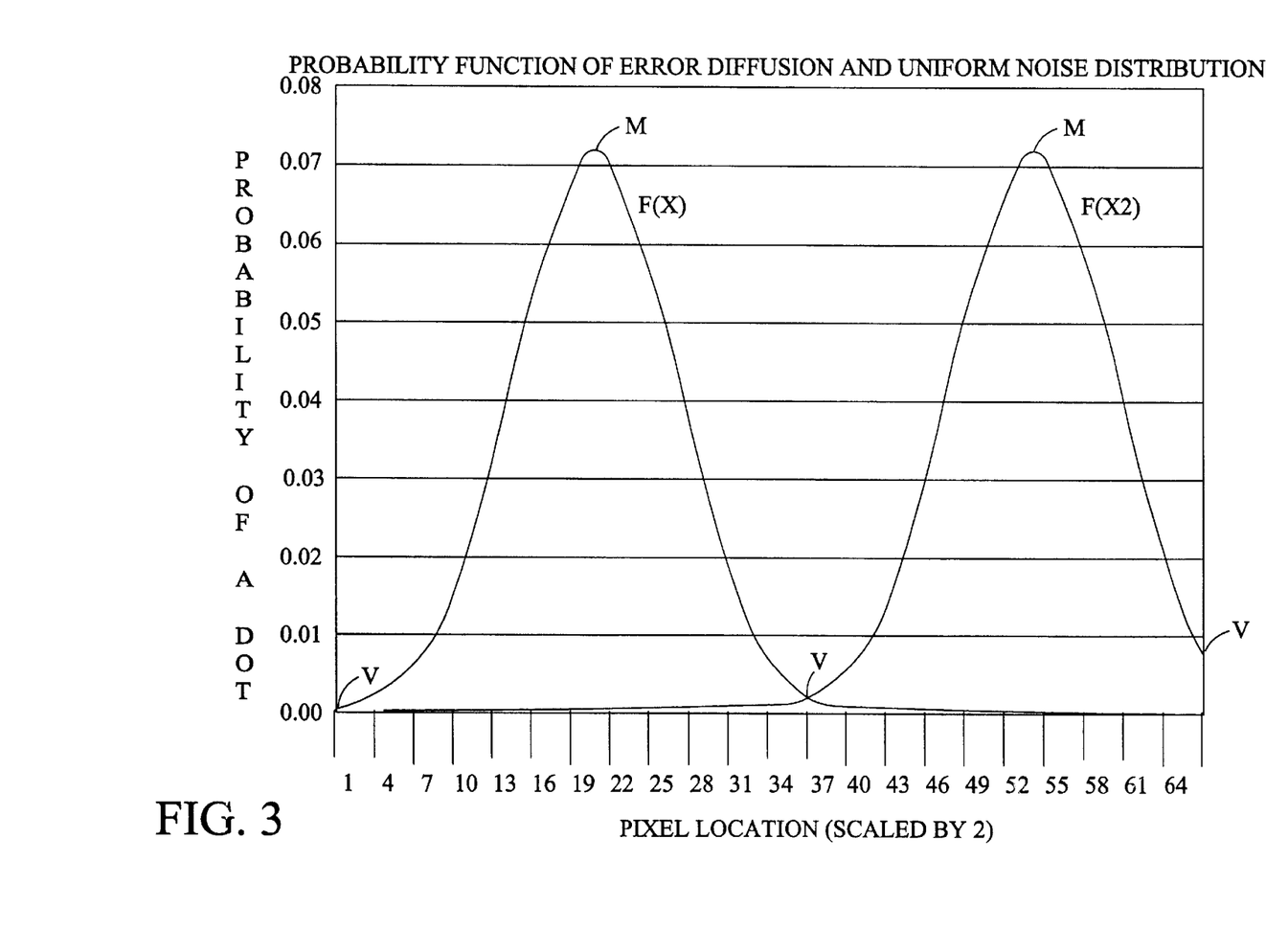
FIG. 3 is a graph of a probability function of error diffusion and uniform noise distribution.

Referring to FIG. 3, the probability function of 20% uniform noise together with an ideal error diffusion probability function is shown. The uniform noise probability distribution is represented by a white noise, which may be provided by a uniform random generator. A uniform probability distribution is also an acceptable approximation for blue noise. Although blue noise is optimized to be periodic, it is still generated outside of the run-time processing of error diffusion. The frequency and phase shift of a blue noise mask is not synchronized with local conditions of frequency and the phase angle of the error diffusion process. As such, a blue noise mask modulation in error diffusion can be approximated using a uniform distribution, as shown in FIG. 3, without loss of continuity. Other types of noise, such as patterned noise, angle screens, ordered dither, may also be approximated using a uniform probability distribution for the same reason without loss of continuity.

When noise is introduced into an error diffusion system it degrades the original image information as well as introduces graininess to the image. As illustrated in FIG. 3, for example, at the highest probability locations M where a pixel should be ideally outputted, a negative noise is introduced at that position potentially causing that pixel to not output a desired dot. The image information at that pixel location is therefore potentially lost or obscured by the noise. Similarly, at a valley location (v) where a dot should not be generated (probability of dot output=0) a positive noise is introduced at that position potentially causing that pixel to output an undesired dot. The result, in this case, is that graininess is introduced to the output image. This is a common problem with modulating the threshold with position based noise.

Figure 4:
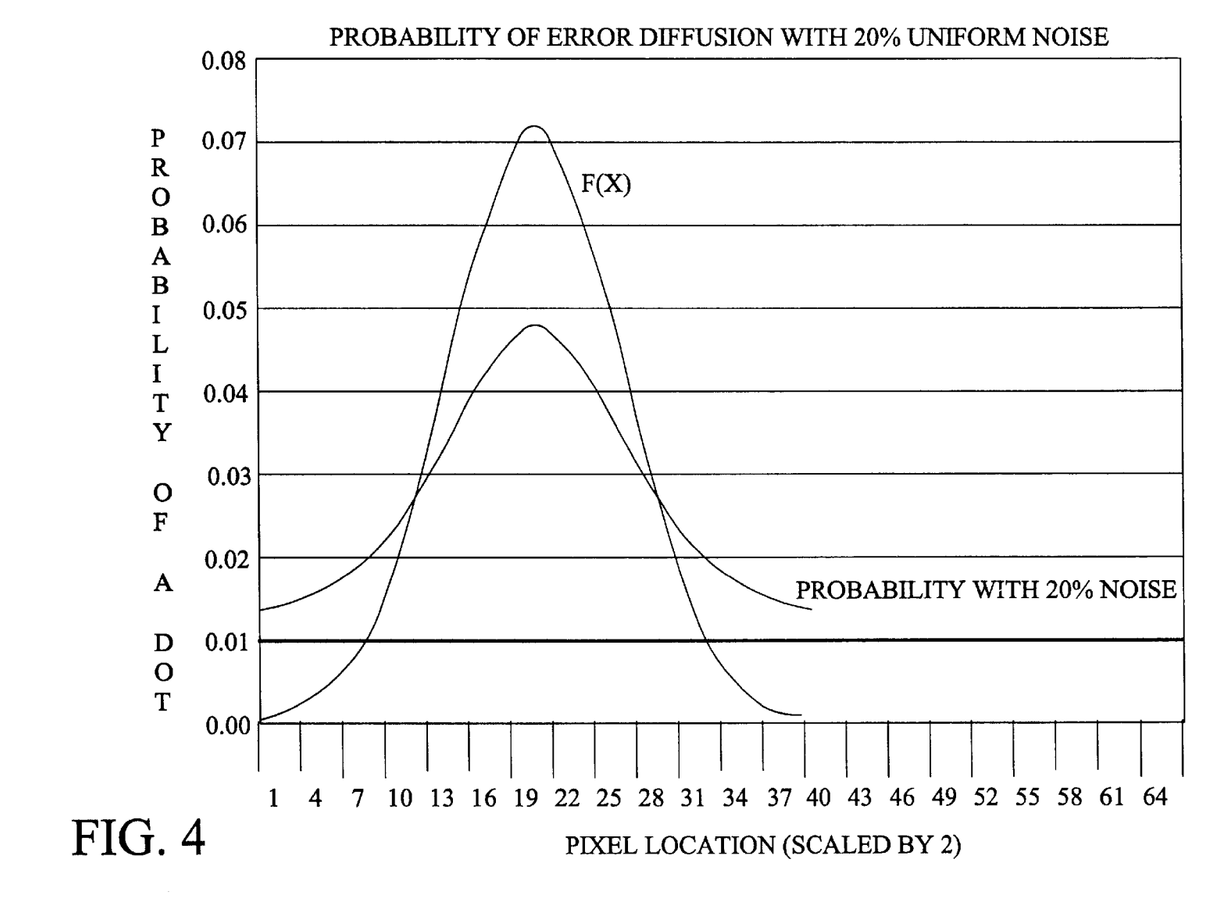
FIG. 4 is a graph of a probability of error diffusion with 20% uniform noise.

Referring to FIG. 4, a probability function with an ideal error diffusion with 20 percent noise modulation, is shown. FIG. 4 may be represented by the following equation:

$$\text{Prob(Error diff w/20\% noise)}<>\text{Prob(error diffusion)}+0.2*\text{Prob(noise)}.$$

The higher curve in FIG. 4 is the probability function for a dot to output in an ideal error diffusion without noise modulation. The flattened curve represents the probability function of a dot to output with 20% noise modulation added to the error diffusion. As the present inventor observed, large amounts of image information is lost by the addition of uniform noise. At peak location M where a pixel should be outputted, the probability is reduced by 20%; therefore, 20% of the information is lost. At a valley location, where no pixel information should exist, there is now a 20% chance that a pixel will be placed, causing graininess. It is to be understood that the advantage of modulating the error diffusion with noise is that artifacts will be blurred away proportionally to the amount of image information lost.

Figure 5:
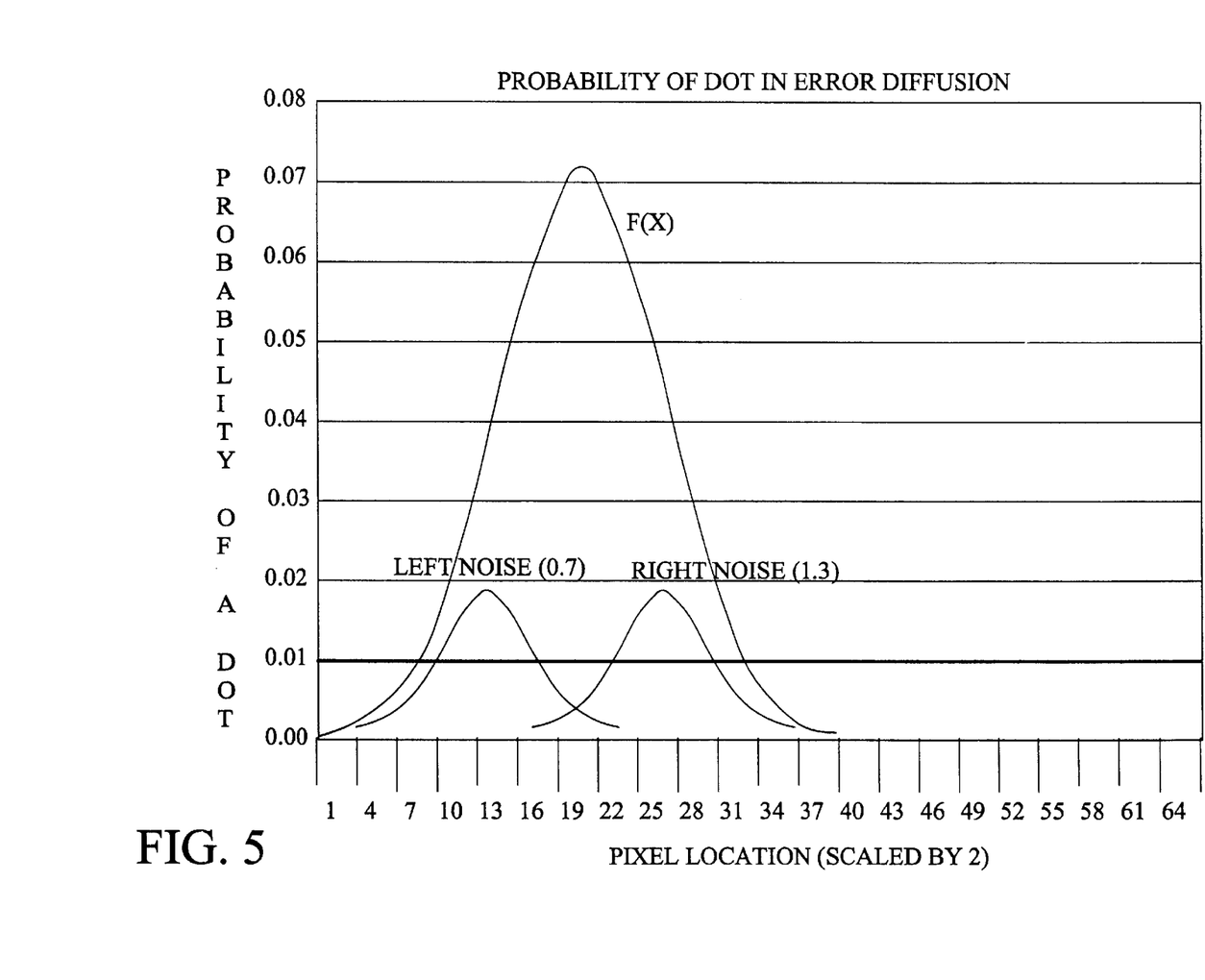
FIG. 5 is a graph of a dot in error diffusion with noise curves shown thereon.
Figure 6:
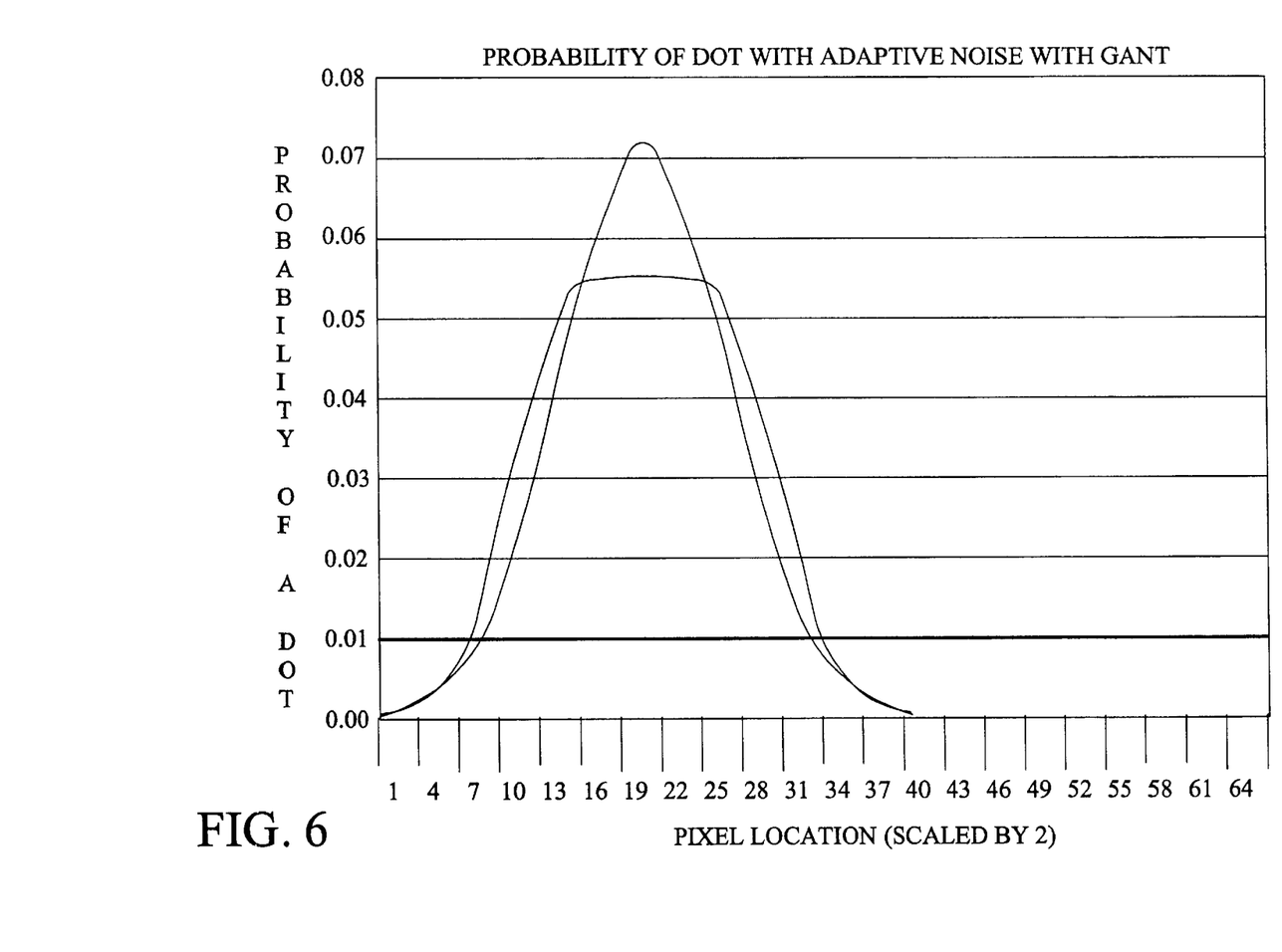
FIG. 6 is a graph of a probability function of a dot with adaptive noise of FIG. 5 applied thereto.

Based on this observation of sub-optimal performance, the present inventor came to the realization that a different noise profile may be used to further adjust the probability function to remove artifacts. The present inventor came to the further realization that Guassian noise is suitable to adjust the probability function for optimal artifact removal. Referring to FIG. 5, two 20% Guassian bell curves are applied between the peak and valley of the probability function of an ideal error diffusion. The probability functions may be described as follows:

$$P(GANT1)=P(\text{mean}=M-0.3W, Sd=2.0, w=W/2)$$

$$P(GANT2)=P(\text{mean}=M+0.3W, Sd=2.0, w=W/2),$$

where,

M: mean probability curve for error diffusion,

Sd: standard deviation,

W: principal wavelength of ideal error diffusion at the particular gray level, and     w: principal wavelength for the noise function. The resulting probability function is shown in FIG. 6, where, $$\text{New Prob (GANT)}=\text{Prob (error diffusion)}+P(GANT1)+P(GANT2)$$

The resulting probability function includes a generally flat region (plateau) surrounding peak M. The plateau region generates a slight perturbation in the surrounding area where a dot should be placed. This results in pleasing high frequency content and blue noise type smoothness at the output. The image detail is not lost because dots are placed randomly in the vicinity of the ideal location. Also, it may be observed that at a valley where a dot should not be placed, the probability function remains identical (or substantially identical), therefore graininess is not added to the system.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method for selecting an output color for a subject pixel comprising,

(a) comparing an input color signal to a boundary separating available output colors;

(b) adjusting said input color signal, at least in part, to reflect a relationship between said output color of a previous pixel and said input color signal of a previous pixel for another pixel; and     (c) adjusting said boundary, at least in part, to reflect a change in a magnitude of a Guassian like noise.

2. The method of claim 1 wherein said boundary is further adjusted as a function of said input color signal.

3. The method of claim 1 wherein said boundary is further adjusted as a function of a luminance level of said input color signal.

4. The method of claim 1 wherein said relationship is a difference between said output color and said input color signal for said another pixel.

5. The method of claim 1 wherein said output color is a color to be displayed on a monitor.

6. The method of claim 1 wherein said output color is a color to be produced by a printer.

7. The method of claim 1 wherein said noise is a predetermined noise.

8. The method of claim 7 wherein said noise is Guassian.

9. An error diffusion method for digital halftoning comprising:
   (a) selecting an output color for a first pixel by comparing an adjusted input color signal for said first pixel to a boundary between available output colors;
   (b) computing an error between said adjusted input color signal and said output color of said first pixel;
   (c) adjusting said input color signal for a second pixel as a function of said error;
   (d) adjusting said boundary between available output colors as a function of an adjustable Guassian like noise; and
   (e) selecting an output color for said second pixel by comparing said adjusted input color signal for said second pixel to said adjusted boundary.

10. The method of claim 9 wherein said boundary is further adjusted as a function of said input color signal.

11. The method of claim 10 wherein said output color is a color to be displayed on a monitor.

12. The method of claim 10 wherein said output color is a color to be produced by a printer.

13. The method of claim 10 wherein said adjustable noise is a predetermined noise.

14. The method of claim 13 wherein said noise is Guassian.

15. The method of claim 9 wherein said boundary is further adjusted as a function of a luminance level of said input color signal.

16. An error diffusion method for digital halftoning comprising:
   (a) selecting an output color signal for a pixel by comparing an adjusted input color signal for said pixel to a boundary separating a plurality of available output color signals;
   (b) computing a difference between said output color signal and said adjusted input color signal;
   (c) adding a weighted portion of said difference to an input color signal for another pixel;
   (d) applying a function of said difference, a Gaussian transformation, and a noise to modify said boundary; and
   (e) selecting an output color signal for said another pixel by comparing said input color signal for said another pixel including said weighted portion of said difference with said modified boundary.

17. The method of claim 16 wherein said boundary is further modified as a function of said input signal of said another pixel.

18. The method of claim 16 wherein said boundary is further modified as a function of a luminance level of said input color signal of said another pixel.

19. The method of claim 16 wherein said output color is a color to be displayed on a monitor.

20. The method of claim 16 wherein said output color is a color to be produced by a printer.

21. The method of claim 16 wherein said noise is a predetermined noise.

22. The method of claim 21 wherein said noise is Guassian.

23. A method of error diffusion for digital halftoning comprising:
   (a) disassociating an input image into a plurality of input signals representing a color of each of a plurality of input image pixels;
   (b) altering said input signal for a subject pixel with a diffusion function of an error signal for another pixel;
   (c) modifying said diffusion function of said error signal with a transformation function;
   (d) altering said modified diffusion function with a boundary adjustment function that includes an adjustable Guassian like noise input;
   (e) adjusting a color space boundary in a color pallette for an output device by said diffusion function as modified by said transformation function and said boundary adjustment function; and
   (f) selecting an output color from said color pallette for said subject pixel by comparing said altered input signal for said subject pixel to said adjusted color space boundary.

24. The error diffusion method of claim 23, further comprising selecting said transformation function as a function of said input signal.

25. The error diffusion method of claim 23, further comprising selecting said boundary adjustment function as a function of said input signal.

26. The method of claim 23 wherein said output color is a color to be displayed on a monitor.

27. The method of claim 23 wherein said output color is a color to be produced by a printer.

28. The method of claim 23 wherein said adjustable noise is a predetermined noise.

29. The method of claim 28 wherein said noise is Guassian.

\* \* \* \* \*

UNITED STATES PATENT AND TRADEMARK OFFICE
CERTIFICATE OF CORRECTION

PATENT NO. : 6,707,576 B1
DATED : March 16, 2004
INVENTOR(S) : William H. Chang

Page 1 of 1

It is certified that error appears in the above-identified patent and that said Letters Patent is hereby corrected as shown below:

<u>Column 4,</u>
Line 40, change "$\Sigma A(n)*E(I-nmj-n)$" to read -- $\Sigma A(mn)*E(I-m,j-n)$ --.

Signed and Sealed this

Twentieth Day of December, 2005

JON W. DUDAS
*Director of the United States Patent and Trademark Office*